United States Patent
Keyes, Sr.

(10) Patent No.: US 8,544,502 B2
(45) Date of Patent: Oct. 1, 2013

(54) ANCHOR SYSTEM FOR PRE-INSULATED PIPING

(75) Inventor: Thomas Joseph Keyes, Sr., Fort Worth, TX (US)

(73) Assignee: Thermacor Process, LP, Fort Worth, TX (US)

( * ) Notice: Subject to any disclaimer, the term of this patent is extended or adjusted under 35 U.S.C. 154(b) by 891 days.

(21) Appl. No.: 12/701,152

(22) Filed: Feb. 5, 2010

(65) Prior Publication Data

US 2010/0320750 A1 Dec. 23, 2010

Related U.S. Application Data

(63) Continuation-in-part of application No. 12/456,664, filed on Jun. 19, 2009, now abandoned.

(51) Int. Cl.
*F16L 3/00* (2006.01)

(52) U.S. Cl.
USPC .............................. 138/106; 138/149; 138/155

(58) Field of Classification Search
USPC .......................................... 138/149, 155, 106
See application file for complete search history.

(56) References Cited

U.S. PATENT DOCUMENTS

| | | | | |
|---|---|---|---|---|
| 2,360,067 A * | 10/1944 | McLeish | | 138/105 |
| 2,546,533 A * | 3/1951 | Williamson | | 248/49 |
| 3,168,114 A * | 2/1965 | Martin | | 138/105 |
| 3,259,402 A * | 7/1966 | Wyatt | | 285/121.1 |
| 3,351,361 A * | 11/1967 | Martin | | 285/47 |
| 3,642,308 A * | 2/1972 | Zeile et al. | | 285/47 |
| 3,747,961 A * | 7/1973 | Couch et al. | | 285/123.17 |
| 3,899,007 A * | 8/1975 | Miller | | 138/114 |
| 4,124,040 A * | 11/1978 | Miller | | 138/148 |
| 4,415,184 A * | 11/1983 | Stephenson et al. | | 285/47 |
| 6,978,807 B1 | 12/2005 | Keyes | | |
| 7,028,717 B1 | 4/2006 | Keyes | | |
| 7,143,788 B2 | 12/2006 | Keyes | | |
| 7,418,979 B2 | 9/2008 | Keyes | | |
| 7,960,978 B2 * | 6/2011 | Keyes | | 324/694 |
| 2007/0152440 A1* | 7/2007 | Keyes | | 285/45 |

* cited by examiner

*Primary Examiner* — James Hook
(74) *Attorney, Agent, or Firm* — Charles D. Gunter, Jr.

(57) ABSTRACT

An anchor system is shown for use with a pre-insulated piping system having an inner steel carrier pipe surrounded by a layer of insulation and then by an outer protective jacket. The anchor system includes an inner carrier pipe for insertion within the length of the piping system at a selected point. A steel anchor sleeve surrounds a portion of the length of carrier pipe and insulation. It terminates at one end at an outwardly flaring anchor plate which is subsequently embedded within a concrete anchor block. A steel end cap is welded to a second, opposite end of the sleeve and to the inner carrier pipe at a point along the length of piping which is outside the concrete anchor block and which is spaced apart from the location of the anchor plate, whereby heat from the high temperature fluids in the piping is transferred to the end cap at a location along the length of piping which is distant from the location of the anchor plate.

5 Claims, 6 Drawing Sheets

FIG. 7

ANCHOR SYSTEM FOR PRE-INSULATED PIPING

CROSS REFERENCE TO RELATED APPLICATIONS

This application is a continuation-in-part of earlier filed U.S. patent application Ser. No. 12/456,664, filed Jun. 19, 2009, entitled "Anchor System For Pre-Insulated Piping," by the same inventor.

BACKGROUND OF THE INVENTION

1. Field of the Invention

The present invention relates to pre-insulated piping systems of the type used to convey high temperature fluids and to an improved anchor installation for such systems for anchoring a section of pre-insulated piping to prevent undesired movement thereof.

2. Description of the Prior Art

There are many instances in which insulated pipelines are needed. For example, distributed HVAC (heating, ventilation and air conditioning) applications utilize chilled water for cooling and steam for heating. The chiller and boiler are typically contained in a central location and the chilled water and steam are distributed to other locations. For example, on a school or college campus, the chiller and boiler may be located in a power plant building. The chilled water and steam are distributed to classrooms in separate buildings.

A set of insulated pipelines is used to convey the chilled water from the chiller to other locations and back to the chiller. Another set of insulated pipelines is used to carry the steam from the boiler to the other locations and back to the boiler. The insulated pipelines are usually located underground.

Pre-insulated pipe is conventional and commercially available. There are predominately two types of such piping systems in use: Class-A drainable dryable testable (DDT); and polyurethane or polyisocyanurate "bonded" foam systems. Both of these systems use an inner carrier pipe to convey fluid. Although steel is commonly used for the inner pipe which carries the media to be piped, copper or aluminum or other metals as well as fiberglass, PVC, and similar materials may be utilized, as well. Around the outside of the steel pipe is a layer of insulating foam such as, for example, polyisocyanurate foam. Around the outside of the foam is a jacket of hard thermoplastic (such as high density polyethylene, HDPE). The foam has set up or cured within the outer jacket so as to bond to the jacket and to the inner pipe. The plastic jacket protects the foam from mechanical damage and also provides a water tight seal to prevent corrosion of the steel pipe. In the bonded type system, the foam and outer jacket do not move relative to the inner pipe. In the Class-A type system, on the other hand, the insulated inner pipe is designed to move independently of the associated outer jacket. In fact, there is an air gap between the inner pipe and outer carrier pipe in the class-A type system.

There are various examples in the prior art of the need for "anchoring" such pre-insulated piping systems, either to guard against earth movement or to counteract thermal stresses in the pipe line itself. Also, anchors are generally needed at the entry ports of piping into, for instance, a concrete wall. The concrete wall might be a structural wall or foundation wall of a residential, commercial or industrial building or structure. Another common example is in the area of concrete manholes, valve pits and the like, in which conduits enter and leave the manhole through a sealed "porthole" or point of entry of the conduit into a sidewall or riser section of the manhole. It is generally necessary to anchor the pre-insulated pipeline at a point just prior to entry into the manhole since the sealed porthole does not generally allow for longitudinal movement of the piping.

Despite the advances which have been made in pre-insulated piping systems in recent years, and in particular to anchor points in such systems, a need continues to exist for further improvements.

For example, a need exists to better accommodate the high temperatures which are presently experienced at the location of the steel anchor plate which is used in such anchor assemblies, where the anchor plate contacts the steel carrier pipe and also contacts the surrounding foam insulation, particularly where the steel carrier pipe is carrying high temperature fluids.

Reducing the excess heat present at the anchor point would also prolong the life and increase the effectiveness of the corrosion protective coatings which are conventionally applied to the anchor plate and other metal components of the system.

A need also exists for such an anchor system which utilizes many of the conventionally available materials and manufacturing techniques commonly used in the industry and which is relatively simple in design and economical to implement.

SUMMARY OF THE INVENTION

It is therefore an object of the present invention to provide a mechanism for better accommodating the high temperatures which are presently experienced at the location of the steel anchor plate which is used in such anchor assemblies of the type described, where the anchor plate contacts the steel carrier pipe and also contacts the surrounding foam insulation, particularly where the steel carrier pipe is carrying high temperature fluids.

By providing a mechanism for controlling the heat transfer which occurs at the steel anchor plate, the life and effectiveness of conventional corrosion coatings for the metal surfaces employed will be extended and improved. It is also possible that less exotic, more economical corrosion coatings can be effectively employed.

Accordingly the present invention has as its object to provide an improved anchor installation for a pre-insulated piping system of the type used for conveying high temperature fluids. The particular type of piping system under consideration includes lengths of insulated and jacketed pre-insulated piping. In one form of the invention, the improved anchor installation is applied to a bonded foam pre-insulated piping system; i.e., the piping is made up of an inner carrier pipe having an interior surface and an exterior surface with an envelope of foamed insulation surrounding the inner pipe exterior surface. An outer protective jacket surrounds the envelope of insulation. The length of piping has a joining end for joining to an adjacent length of piping, whereby the adjacent lengths of piping provide a continuous length of fluid conduit for conveying high temperature fluids.

In the bonded foam system, the anchor installation of the invention is located at a selected point along the length of the piping system and includes an inner metal carrier pipe for joining to the joining end of an adjacent length of bonded foam piping in the piping system. The carrier pipe is surrounded by an envelope of foamed insulation. A special metal anchor sleeve surrounds at least a portion of the length of carrier pipe and foamed insulation. The anchor sleeve has a cylindrical length which terminates at a first end at an outwardly flaring anchor plate which is subsequently embedded within a concrete anchor block. The sleeve also has an opposite, second end. The sleeve is arranged to surround the envelope of foamed insulation in spaced apart relationship to the inner carrier pipe and extend outwardly from the concrete anchor block along the length of piping for a predetermined distance.

A metal end cap, or other closure device, joins the anchor sleeve at the second end thereof to the inner carrier pipe at a point along the length of piping which is outside the concrete anchor block and which is spaced apart from the location of the anchor plate, whereby heat from the high temperature fluids in the piping is transferred to the end cap at a location along the length of piping which is distant from the location of the anchor plate.

The inner carrier pipe of the anchor installation has an opposite end which extends from the anchor block in an opposite direction from the anchor sleeve. The opposite end of the carrier pipe is surrounded by a layer of foam insulation and then by an outer protective jacket. In one preferred form of the anchor assembly of the invention, the outer protective jacket is, in turn, surrounded along a portion of the length thereof by a watershed ring which is joined to the anchor plate at one extent and which is joined to the outer protective jacket at an opposite extent. In one preferred form, the watershed ring is formed of metal and the outer protective jacket is formed of a synthetic polyolefin material, the watershed ring being joined to the outer protective jacket by a watertight sleeve of heat shrink material.

Preferably, the foam insulation is selected from the group consisting of polyurethane foams and high temperature polyisocyanurate foams. The outer protective jacket is preferably a synthetic polyolefin, such as HDPE. The lengths of insulated piping can be part of a pipeline conveying steam, hot water or other hot fluids at a temperature above about 212° F.

While the preferred form of the invention has been described with respect to a bonded foam pre-insulated piping system, the principles thereof can also be applied to a drainable, dryable, testable (DDT) system. While such systems generally feature different types of surrounding insulating materials and an air space between the inner carrier pipe and an outer metal conduit, the same type of metal end cap can be used to join the anchor sleeve at a second end thereof to the inner carrier pipe at a point along the length of piping which is outside the concrete anchor block and which is spaced apart from the location of the anchor plate. In this way, heat from the high temperature fluids in the carrier piping is again transferred to the end cap at a location along the length of piping which is distant from the location of the anchor plate.

Additional objects, features and advantages will be apparent in the written description which follows.

DETAILED DESCRIPTION OF THE INVENTION

The preferred version of the invention presented in the following written description and the various features and advantageous details thereof are explained more fully with reference to the non-limiting examples included in the accompanying drawings and as detailed in the description which follows. Descriptions of well-known components and processes and manufacturing techniques are omitted so as to not unnecessarily obscure the principle features of the invention as described herein. The examples used in the description which follows are intended merely to facilitate an understanding of ways in which the invention may be practiced and to further enable those skilled in the art to practice the invention. Accordingly, the examples should not be construed as limiting the scope of the claimed invention.

Figure 1:
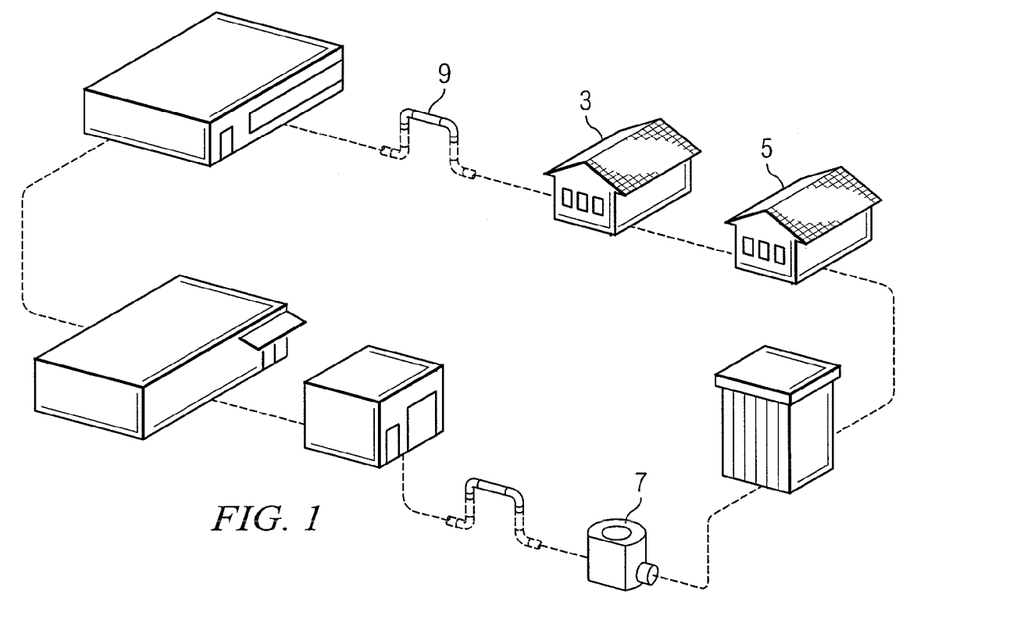
FIG. 1 is a simplified representation of a typical distributed HVAC system of the type under consideration which might utilize a high temperature fluid, such as steam, for heating.
Figure 2:
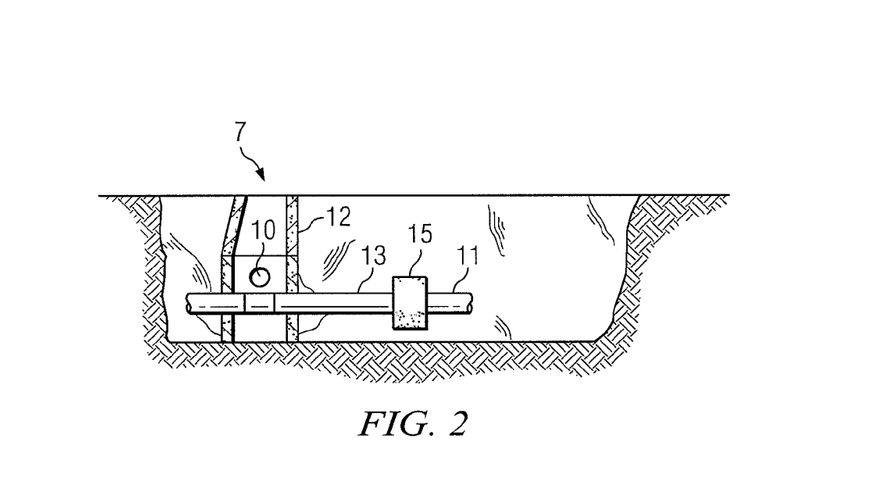
FIG. 2 is a simplified view of an anchor installation of the present invention in a typical arrangement where the pipeline enters an underground valve pit.

Turning first to FIGS. 1-2, there is illustrated a typical environment in which the pre-insulated piping systems of the invention might be employed. FIG. 1 shows a school campus having a number of isolated buildings 3, 5 connected by an underground insulated pipeline carrying steam which at points includes right angle loops or elbows 9. The loops 9 are provided in a typical piping system of the type illustrated in order to compensate for expansion and contraction forces which are exerted on the piping. The piping system will also typically include one or more manholes or "valve pits" 7. The valve pits 7 are typically formed of cast concrete and include portholes (10 in FIG. 2) and riser sections 12.

As will be appreciated by those skilled in the art, the anchor systems of the invention could be used with a variety of types of pipes and pipe installations. For sake of illustration, the principles of the invention will first be described in relation to a concrete valve pit used in a "bonded foam" type insulated steam piping system. FIG. 2 is a somewhat simplified view of a portion of such an underground piping system of the type under consideration in which pipe sections 11 and 13 are located in generally parallel underground plane and which are intended to intersect previously located manhole or valve pit 7. The pipe sections 11, 13 are foam bonded pre-insulated piping sections, as that term is used in the relevant art. Each length of pipe includes an inner pipe, typically formed of steel, an envelope of foamed insulation surrounding the inner pipe, and outer protective jacket surrounding the envelope of insulation. The joining ends of the adjacent steel inner carrier pipe are affixed, as by being welded together, to form fixed joints, whereby the adjacent pipe lengths provide a continuous fluid conduit for conveying high temperature fluids. The inner foamed insulation will typically be of polyurethane or high temperature polyisocyanurate, while the outer protective jacket is typically formed of high density polyethylene (HDPE) or a similar polyolefin type material. The following references, among others, teach the manufacture of prior art insulated piping systems of the general type under consideration: U.S. Pat. Nos. 3,793,411l; 4,084,842; and 4,221,405, all to Stonitsch et al.

The piping systems of the type illustrated in the drawings are typically utilized to convey fluids at high temperature and/or pressures. For example, a typical steam line might be conveying fluid at, for example, 320° F. The temperature differentials which exists between the piping system materials and the fluid being conveyed cause expansion and contraction forces to be applied along the coaxially aligned pipe lengths.

The expansion and contraction forces are partially compensated for in the prior art by including one or more expansion loops (illustrated at 9 in FIG. 1). However, it is also typically necessary to include one or more anchor installations (such as anchor installation 15 in FIG. 2) at various points along the length of piping. For example, it is typically necessary to install an anchor assembly just prior to the porthole openings (such as the porthole opening 10 in FIG. 2) of the concrete manhole, since the sealed portholes do not generally allow for longitudinal movement of the piping. This is primarily due to the fact that the piping is sealed at the point of entry into the manhole or valve pit.

For example, a Century Line Sleeve® can be cast into the wall of the concrete manhole at the porthole location. This commercially available product is a generally cylindrical sleeve formed of a polyolefin material, such as high density polyethylene, which lines the porthole in the wall of the concrete valve pit or manhole and which receives the section of the piping entering the interior of the manhole. A Link-Seal® is one type of sealing system is then used to form the seal between the piping and the Line Sleeve®. Both items are commercially available from Thunderline/Link-Seal of Houston, Tex. The Link-Seal® is a modular, mechanical type of seal, consisting of inter-locking synthetic rubber links shaped to continuously fill the annular space between the pipe and the wall opening containing the Line Sleeve®. The presence of these and other similar types of seal assemblies generally make it necessary to use a cast concrete anchor assembly in front of the porthole entry into the manhole or valve pit.

Figure 3:
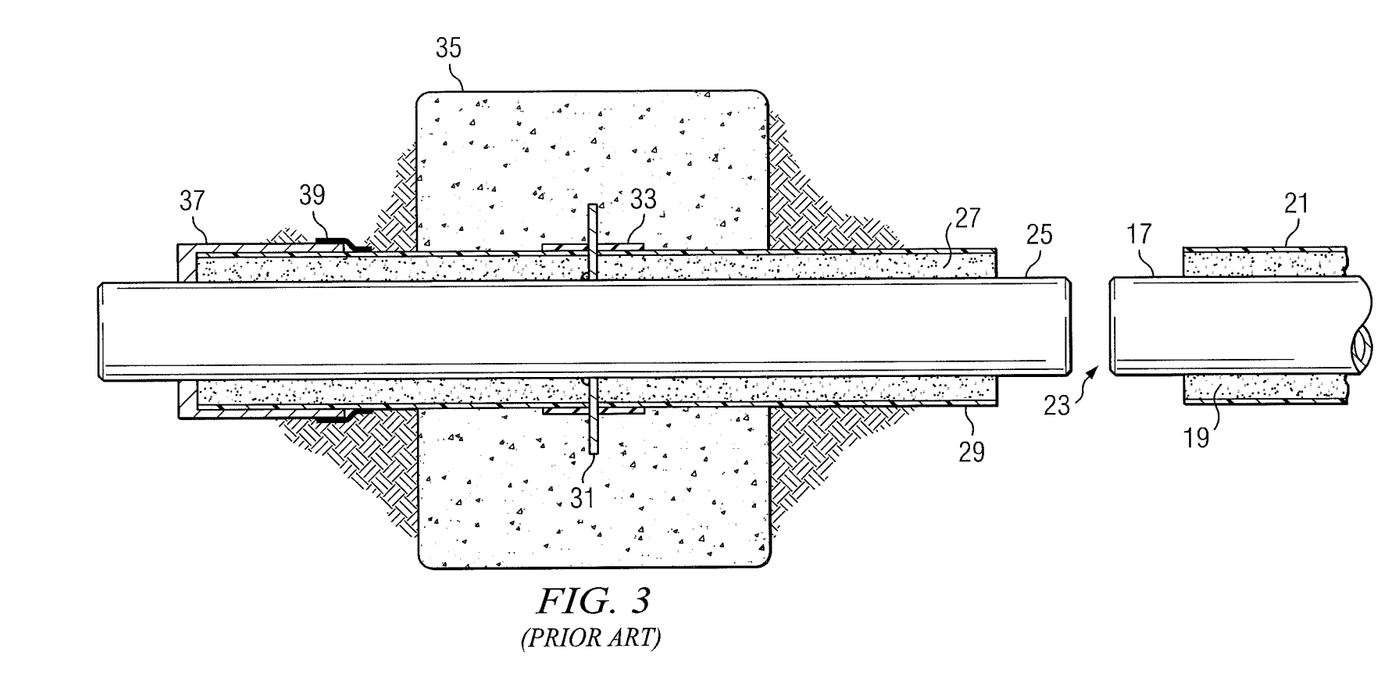
FIG. 3 is a partial sectional view of a typical prior art anchor installation of the type under consideration.

FIG. 3 is a partial cross-sectional view of a prior art anchor assembly of the type under consideration which is shown being used with the bonded foam type pre-insulated piping system. The anchor system is used with a length of insulated and jacketed pre-insulated piping of the type having an inner carrier pipe 17 (shown broken away in FIG. 3) typically formed of a suitable metal, such as steel, and having an interior surface and an exterior surface. An envelope of foamed insulation 19 surrounds the inner pipe exterior surface and may comprise, for example the previously described high temperature polyisocyanurate. An outer protective jacket 21 surrounds the envelope of insulation. The outer protective jacket may be an HPDE material. The length of piping has a joining end 23 for joining to an adjacent length of piping, whereby the adjacent lengths of piping provide a continuous length of fluid conduit for conveying high temperature fluids.

Prior art pipe lengths of this general type are commercially available as standard factory type product. For example, such product is available from Thermacor Process, LP of Fort Worth, Tex., assignee of the present invention. One typical example is sold commercially as the "HT-406 High Temp Steel Piping System™."

As will be appreciated, in the discussion which follows, the improved anchor systems of the invention can be used advantageously with the bonded foam "HT-406 High Temp Steel Piping System™" of the type illustrated. However, as will be described in greater detail, the anchor systems of the invention might also be used with other commercial piping systems used in the insulated pipe industries, as well. For example, the system of the invention could be used with Applicant's "Duo-Therm 505"™ system, or similar systems. In other words, the unique aspects of Applicant's systems may be used in a variety of applications requiring anchor installations. For example, the systems of the invention offer particular utility in situations where the insulated pipelines are subject to expansion and contraction forces which must be controlled at the point of entry into the building or structural sidewall or subterranean structure such as a valve pit or manhole.

The reference in the first part of this discussion to pipe "lengths" is intended to refer to standard available factory pre-insulated piping of the type previously described having an inner metal pipe surrounded by an envelope of foamed insulation, which in turn, is contained within a polyolefin jacket. As referred to briefly above, typical commercial practice involves the use of steel, copper, aluminum or alloy conveying pipes, open or closed cell polyurethane, polyisocyanurate, polystyrene or the like, foamed rigid insulation and polypropylene, polybutylene, polyethylene, polyvinylchloride and similar protective jackets.

The term "high temperature", as used in this discussion, will be any temperature exceeding 250° F., which is the present temperature limitation at which polyurethane foam is used in bonded foam systems. Temperatures above 250° F. require the use of higher temperature foams, such as polyisocyanurate foam.

With reference again to the prior art anchor assembly shown in FIG. 3 of the drawings, it will be seen that the anchor assembly has an exposed joining end which includes a steel inner carrier pipe 25 surrounded by a layer of foam insulation 27, which is in turn surrounded by an outer protective jacket 29. An anchor plate 31 in the form of a radially outwardly extending disk is welded to the steel inner carrier pipe at a central location. The anchor plate will also typically be formed of steel. A steel ring 33 is welded to the anchor plate. A heat shrink tape (not shown) is typically applied over the steel ring 33 in order to seal the ring to the HDPE jacket 29. The piping with its associated anchor plate and ring are embedded in a block of cast concrete 35 provided by the contractor. In the particular installation shown in FIG. 3, the opposite end of the carrier pipe is closed off with a steel end cap 37 and a layer of heat shrink material 39 joins the end cap 37 to the HDPE jacket 29.

While anchor installations such as the one shown in FIG. 3 have been used commercially for many years, it will be appreciated that the direct connection between the anchor plate 31 and the inner steel carrier pipe creates a point of direct heat transfer for the high temperature fluids being carried by the inner carrier pipe. As a result, an undesirable "hot point" may be created. This excessive heat can, in some instances, put a strain upon the corrosion coating which is conventionally applied to the anchor plate. The conventionally used corrosion protection coatings include, for example, fusion bonded epoxy, the various urethane coatings, etc.

It would thus be advantageous to make the anchor point "cooler" so that the corrosion protection coatings which are applied to the metal components of the system would work as intended and for an extended period of time. In the past, the available corrosion protection coatings have degraded or failed when exposed to, for example, 220 to 300° F. temperatures and a wet environment, as where the pipeline outer protective jacket has been breached and water contacting the inner carrier pipe starts to boil.

Figure 4:
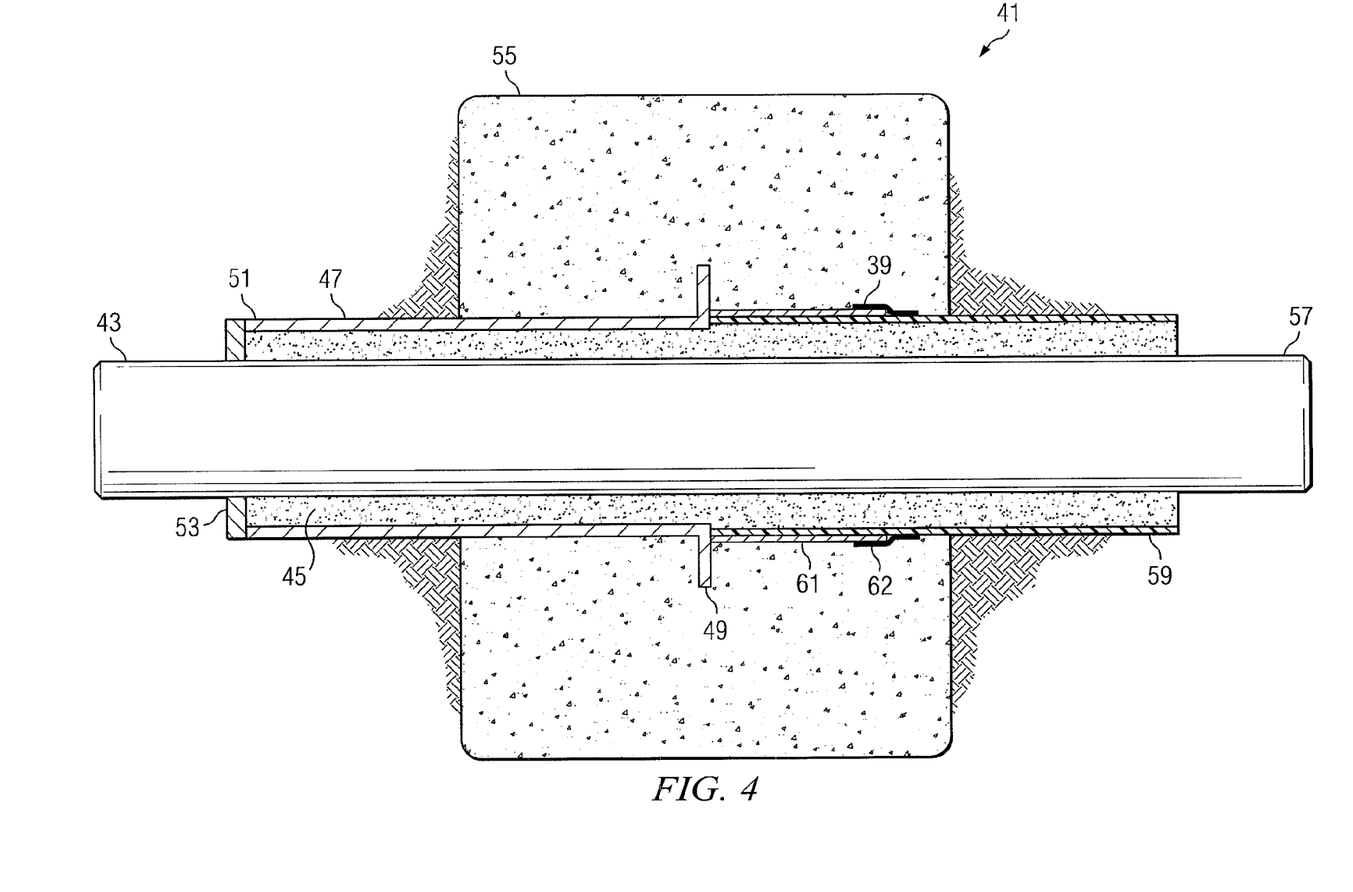
FIG. 4 is a view similar to FIG. 3, but showing the improved anchor installation of the invention.

FIG. 4 illustrates one form of the improved anchor installation of the invention. The anchor system of FIG. 4 is shown as being used with a bonded foam, pre-insulated piping system of the type used for conveying high temperature fluids, such as that which has previously been described with respect to FIG. 3. In other words, the anchor assembly will be joined to a length of insulated and jacketed pre-insulated piping, where the piping has the components 17-23 previously described in FIG. 3.

The anchor installation of the invention is located at a selected point along the length of the piping system. The anchor installation (designated 41 in FIG. 4) includes an inner carrier pipe 43 for joining to the joining end of an adjacent length of piping in the piping system. The carrier pipe is surrounded by an envelope of foamed insulation 45. However, in the case of the anchor assembly of FIG. 4, the foam insulation has a special steel anchor sleeve 47 which surrounds at least a portion of the length of carrier pipe and foamed insulation and extends longitudinally down the horizontal pipe axis. The anchor sleeve is comprised of a generally cylindrical steel conduit having a cylindrical length which terminates at a first end at an outwardly flaring anchor plate 49. The anchor plate 49 forms an outwardly extending flange surface with respect to the remainder of the exterior surface of the anchor sleeve 47. The anchor sleeve 47 also has an opposite, second end 51 which terminates in a steel end plate 53 which is welded to the inner carrier pipe 43 at a point distant from the anchor plate 49.

As will be appreciated from FIG. 4, the anchor sleeve 47 is arranged to surround the envelope of foamed insulation 45 in spaced apart relationship to the inner carrier pipe 43. In other words, the interior of the cylindrical length of the sleeve 47, as well as the terminating anchor plate 49 are spaced apart from the inner carrier pipe 43 along a majority of the length thereof, so that no heat transfer takes place in the vicinity of the anchor plate 49. Any tendency for heat to be transferred by contact with the hot inner carrier pipe 43 would be displaced down the length of the sleeve 47 in the vicinity of the end plate 53 and out of the region of the concrete block 55 and anchor plate 49.

In other words, the second or distal end 51 of the sleeve 47 is closed off by means of the steel end cap 53 or other convenient fixture which is welded onto the carrier pipe 43 at the opposite end of the anchor sleeve 47 from the anchor plate 49. The end cap thus joins the anchor sleeve 47 at the second end 51 thereof to the inner carrier pipe 43 at a point along the length of piping which is outside the subsequently poured concrete anchor block 55 and which is spaced apart from the location of the anchor plate 49. In this way, heat from the high temperature fluids in the piping is transferred to the end cap 53 at a location along the length of piping which is distant from the location of the anchor plate 49. The end cap 53, in effect, forms a sort of "heat sink" for the anchor assembly.

Figure 5:
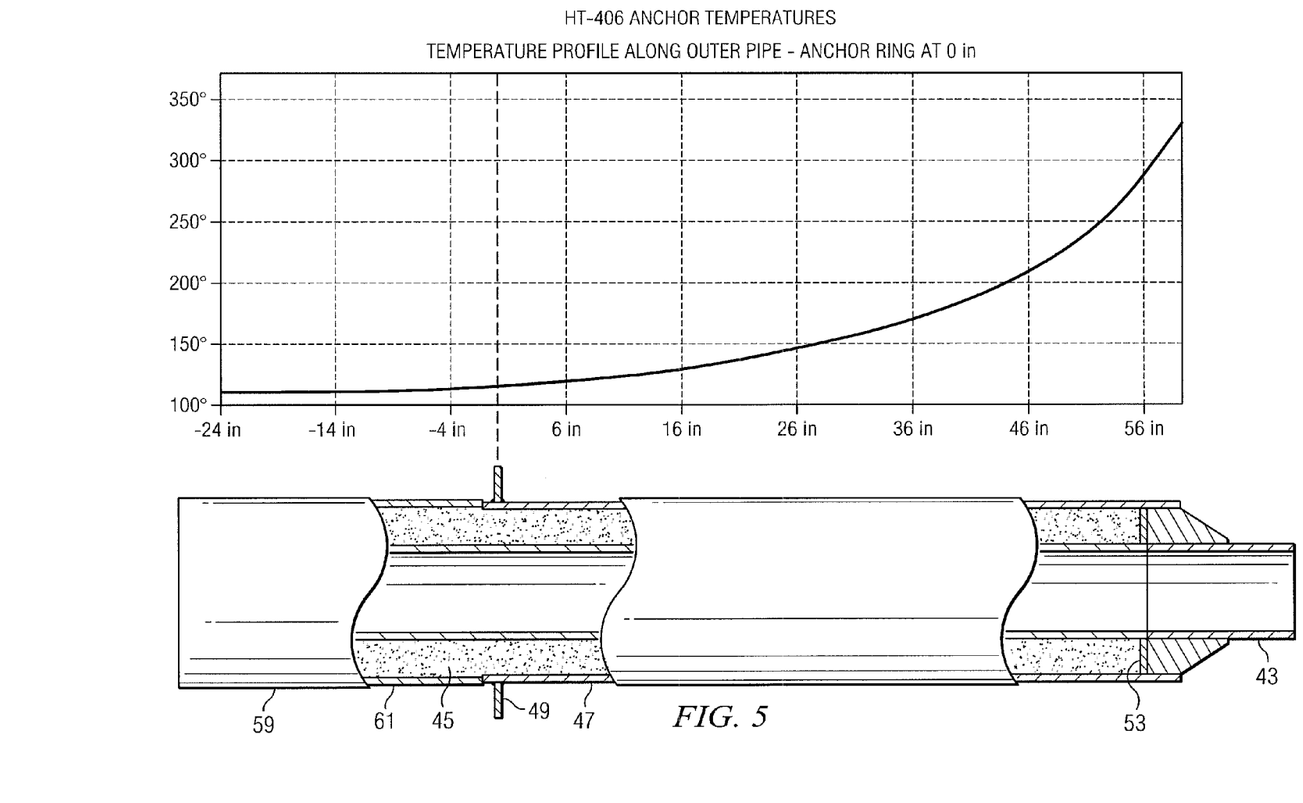
FIG. 5 is another view of an anchor installation similar to FIG. 4 but overlaid with a graph which shows the temperature rise profile along the length of the outer cylindrical sleeve with the anchor plate location being at zero inches.

With reference briefly to FIG. 5 of the drawings, an anchor assembly of the invention, similar to the one shown in FIG. 4 but turned in the opposite direction, is overlaid with a graph showing the temperature profile and consequent heat rise along the outer cylindrical metal sleeve 47 with the anchor plate 49 being at zero inches. As will be apparent from the accompanying graph, the temperature profile gradually increases as the distance from the anchor plate 49 increases along the outer metal sleeve 47. The temperature within about 26 inches of the anchor plate 49 is below about 150° F. At 56 inches from the anchor plate, the temperature is beginning to approach 350° F. The relatively "cooler" temperatures which are experienced at the location of the anchor plate 49 serve to protect the corrosion protective coatings utilized in the vicinity of the anchor plate.

Referring again to FIG. 4, the carrier pipe 43 has an opposite end 57 which extends from the concrete anchor block 55 in an opposite direction from anchor sleeve 47. The opposite end 57 of the carrier pipe is surrounded by a layer of the foam insulation 45, and then by an outer protective jacket 59 which extends from the anchor plate 49 outwardly from the concrete block and parallel to the inner carrier pipe. The outer protective jacket is, in turn, surrounded by a metal watershed ring 61 which is welded at one extent to the anchor plate 49. In order to provide a water proof enclosure, a layer of heat shrink material 62 is used to provide a water proof seal between the watershed ring 61 and the HDPE outer protective jacket 59. The "heat sink" provided by the improved anchor sleeve assembly of the invention offers added protection for both the corrosion protective coating which is conventionally applied to the anchor plate.

A method is also shown for installing an anchor in a section of pre-insulated piping of the type previously described. A first and second lengths of insulated and jacketed piping are provided, each having a joining end to be joined to an end of the other length, each pipe length comprising an inner metal pipe having an interior surface and an exterior surface. An envelope of foamed insulation is applied so that it surrounds the inner pipes exterior surface and envelopes the inner pipes. Thereafter, an outer protective jacket is applied which surrounds the envelope of insulation. The joining ends of adjacent pipe lengths are welded together to form fixed joints which are also surrounded by foam insulation and an outer protective jacket, whereby the adjacent pipe lengths provide a continuous insulated fluid conduit for conveying high temperature fluids.

The anchor assembly of the invention is installed at a selected location within the length of the piping system. The anchor assembly has an inner carrier pipe for joining with ends of adjacent pipe lengths in the length of piping. The assembly includes an inner carrier pipe for joining to the joining end of an adjacent length of piping in the piping system, the carrier pipe being surrounded by an envelope of foamed insulation. The previously described special metal anchor sleeve is used to surround at least a portion of the length of carrier pipe and foamed insulation, where the metal anchor sleeve has a cylindrical length which terminates at a first end at an outwardly flaring anchor plate which is subsequently embedded within a concrete anchor block. The anchor sleeve is arranged to surround the envelope of foamed insulation in spaced apart relationship to the inner carrier pipe and extend outwardly from the concrete anchor block along the length of piping for a predetermined distance.

As previously described, a metal end cap is then used to join the anchor sleeve at the second, distal end thereof to the inner carrier pipe at a point along the length of piping which is outside the concrete anchor block and which is spaced apart from the location of the anchor plate, whereby heat from the high temperature fluids in the piping is transferred to the end cap at a location along the length of piping which is distant from the location of the anchor plate.

Figure 6:
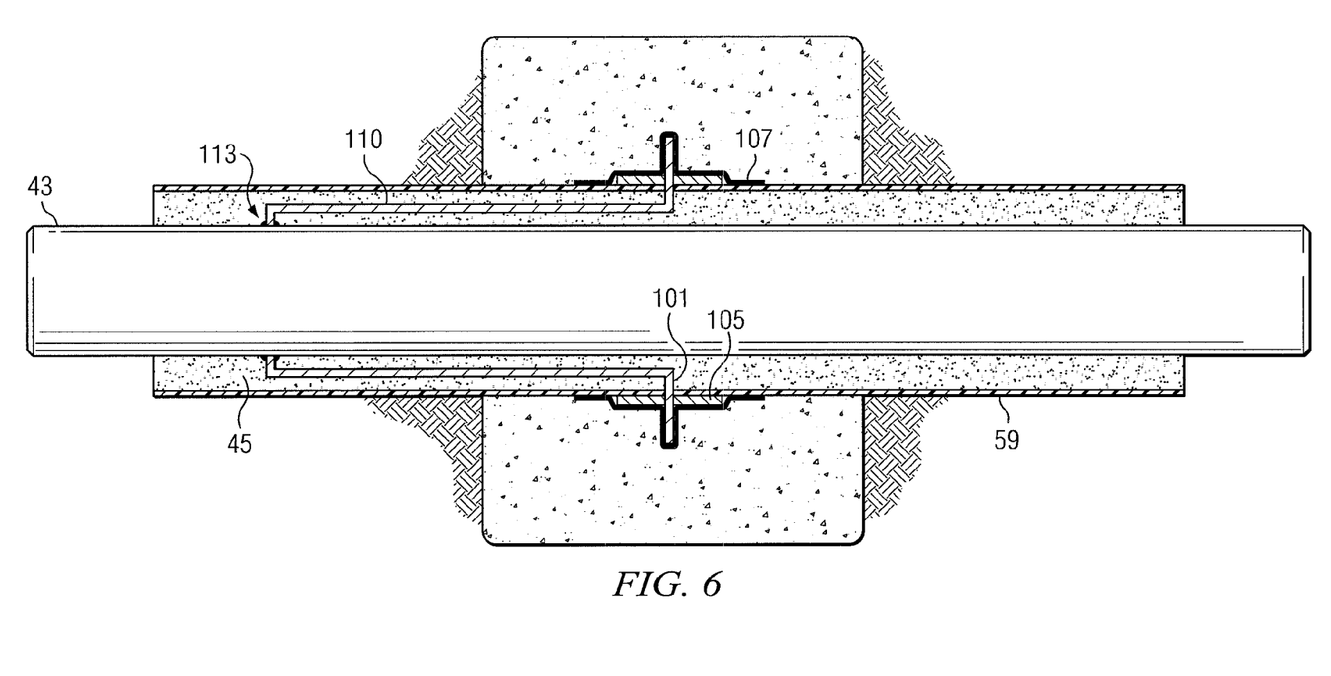
FIG. 6 is a view of another form of the invention, similar to FIG. 3, but showing an in-line anchor, rather than an anchor which is used at a termination point entering a structure.
Figure 7:
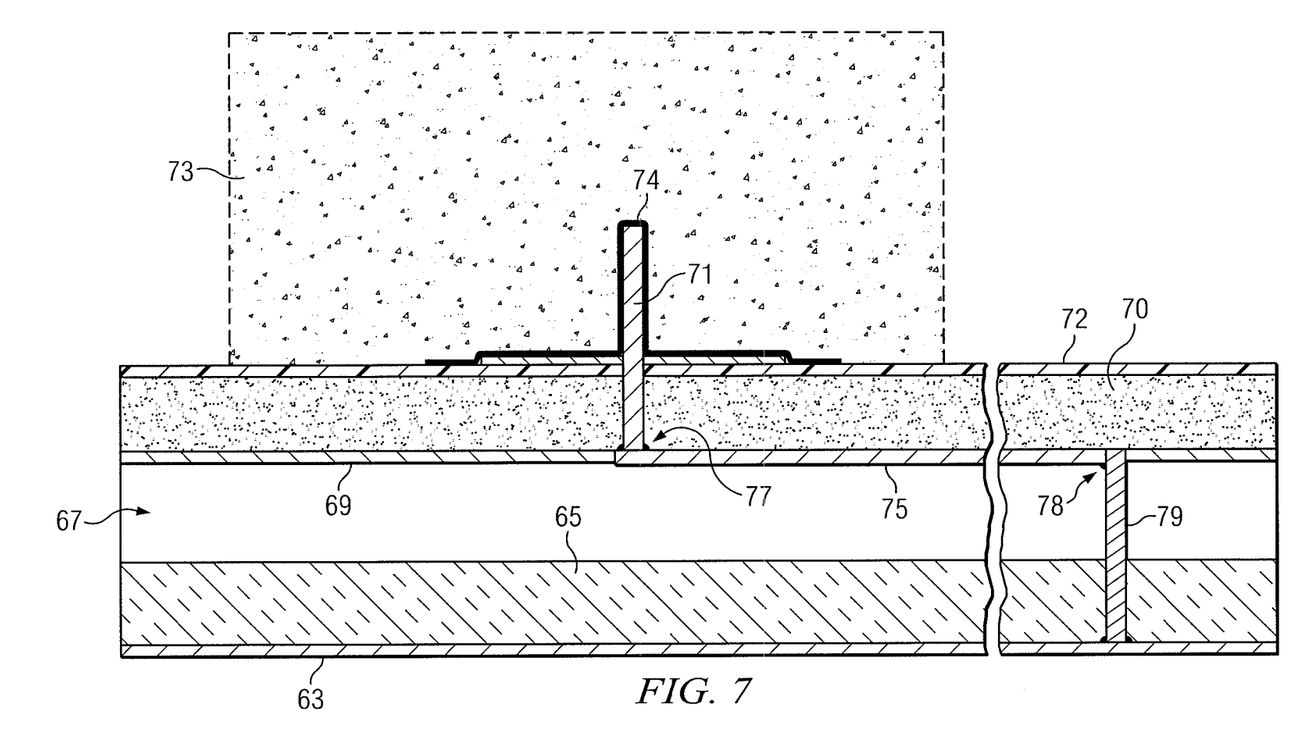
FIG. 7 is a view of another form of the invention in which the anchor installation is applied to a drainable, dryable, testable pre-insulated piping system.

FIG. 6 shows another form of the invention, similar to the installation of FIG. 4, except that an "in-line" anchor installation is shown. In other words, the anchor installation in FIG. 7 is present in a section of the normal pipe run, rather than at the termination point at which the pipe enters a building, a wall, a valve pit, or the like. The installation of FIG. 6 includes the previously described inner metal carrier pipe 43 which is surrounded by a layer of foam insulation 45, the foam insulation 45 being surrounded by an HDPE jacket 59. As shown in FIG. 6, the anchor plate 101, coated with a high temperature corrosion protection coating, is welded to a water shed ring 105. The steel ring 105 is welded continuously to the steel anchor plate 101 and corrosion coated on both sides.

Heat shrink material 107 circumscribes the exposed exterior of the water shed ring 105 and anchor plate 101 and is fusion bonded to the outer HDPE jacket 59. These components of the assembly are conventional. However, as shown in FIG. 6, the anchor plate 101 is now provided with the same type of cylindrical metal sleeve 110 which passes longitudinally down the pipeline through the layer of foam 45 to a point distant from the anchor 101, where it is again welded to the inner steel carrier pipe by means of metal end cap 113, as has previously been described.

FIG. 7 describes another type of pre-insulated piping system which can utilize the improved anchor installation of the invention. With reference to FIG. 7, a drainable, dryable, testable (DDT) type system is shown having the improved anchor installation of the invention. The system again features an inner metal carrier pipe 63 surrounded by a layer of insulating material 65. The insulation in this case might typically be high temperature rated mineral wool. Other insulating materials include foam glass, fiber-glass or calcium silicate. There is then an air gap, illustrated as 67 in FIG. 7, between the exterior of the inner carrier pipe 63 and an intermediate cylindrical metal conduit 69.

The spacing of the carrier pipe relative to the intermediate conduit may be maintained by one or more spacer elements (not shown) located along the length of the piping between the two elements. The intermediate metal conduit 69 is welded to the anchor plate 71 which is again embedded in a concrete block which is poured by the contractor.

As previously described with respect to the bonded foam system, the anchor plate 71 is not directly welded to the inner carrier pipe at the location within the concrete block. Rather, a metal anchor sleeve 75 is provided having a cylindrical length which terminates at a first end 77 where it is welded to the outwardly flaring anchor plate 71. The sleeve 75 also has an opposite, second end 78. Once again, a metal end cap 79 is used to join the anchor sleeve 75 at the second, distal end thereof to the inner carrier pipe 63 at a point along the length of piping which is outside the concrete anchor block 73 and which is spaced apart from the location of the anchor plate. Again, this ensures that heat from the high temperature fluids in the piping is transferred to the end cap 79 at a location along the length of piping which is distant from the location of the anchor plate 71.

The particular DDT piping system shown in FIG. 7 further includes a layer of polyurethane foam 70 surrounding conduit 69 and sleeve 75. The polyurethane foam layer is, in turn, surrounded by an HDPE jacket 72. The anchor plate 71 is further sealed by a heat shrink wrap 74 which is fusion bonded to the HDPE jacket on either side of the anchor plate. The conventional components of the piping system shown in FIG. 5 are commercially available from Thermacor Process; LP of Fort Worth, Tex., assignee of the present invention, as the Duo-Therm 505 System™. The previously described polyurethane and HDPE components used in such a DDT system are all conventional with the exception of the improved anchor plate and anchor sleeve arrangement of the invention which again transfers any heat away from the anchor plate location to the location of the end plate 79.

An invention has been provided with several advantages. The improved anchor assembly of the invention provides an improved anchor point in pre-insulated piping systems of the type which are commercially available in the industry whether bonded foam or DDT systems. The anchor system of the invention is better able to accommodate the high temperatures which are presently experienced at the location of the steel anchor plate in existing anchor systems, where the anchor plate contacts the steel carrier pipe, particularly where the steel carrier pipe is carrying high temperature fluids. Because of the presence of the special anchor sleeve used in the assembly of the invention, the effective heat transfer point between hot fluids in the carrier pipe and the surrounding materials is moved down the length of pipe from the location of the anchor plate. As a result, less strain is placed upon the conventional materials used to make up the anchor assembly.

By decreasing the heat transfer at the location of the anchor point, it is possible to increase the expected useful life of conventional corrosion protective coatings. In fact, even when the outer jacket is breached and water enters the system, conventional corrosion coatings may continue to work for longer periods of time where the anchor location is transformed to a "cool point." The anchor system of the invention utilizes many of the conventionally available materials and manufacturing techniques commonly used in the industry, and which is relatively simple in design and economical to implement.

While the invention has been shown in one of its forms, it is not thus limited but is susceptible to various changes and modifications without departing from the spirit thereof.

What is claimed is:

1. A bonded foam pre-insulated piping system of the type used for conveying high temperature fluids, comprising:

a length of insulated and jacketed pre-insulated piping, the length of piping comprising an inner metal carrier pipe having an interior surface and an exterior surface, an envelope of bonded foam insulation surrounding the inner pipe exterior surface, and an outer thermoplastic protective jacket surrounding the envelope of bonded foam insulation, the envelope of bonded foam insulation being bonded to the inner metal carrier pipe exterior surface and to the outer thermoplastic protective jacket, the length of piping having a joining end for joining to an adjacent length of piping, whereby the adjacent lengths of piping provide a continuous length of fluid conduit for conveying high temperature fluids;

an anchor installation located at a selected point along the length of the piping system, the anchor installation including an inner metal carrier pipe for joining to the joining end of an adjacent length of piping in the piping system, the carrier pipe being surrounded by an envelope of bonded foam insulation, and wherein a special metal anchor sleeve surrounds at least a portion of the length of inner metal carrier pipe and bonded foam insulation, the anchor sleeve having a cylindrical length which terminates at a first end at an outwardly flaring anchor plate which is subsequently embedded within a concrete anchor block, the sleeve also having an opposite, second end, the sleeve being arranged to surround the envelope of bonded foam insulation in spaced apart relationship to the inner metal carrier pipe and extend outwardly from the concrete anchor block along the length of piping for a predetermined distance; and a metal end cap which joins the anchor sleeve at the second end thereof to the metal inner carrier pipe at a predetermined point along the length of piping which is outside the concrete anchor block and which is spaced apart from the location of the anchor plate, the predetermined point where the metal end cap joins the inner metal carrier pipe being selected so that heat from the high temperature fluids in the piping is transferred to the metal end cap at a location along the length of piping which is outside the concrete anchor block and spaced away from the anchor plate, the end cap being the only point of metal contact between the anchor plate and its associated metal anchor sleeve and the inner metal carrier pipe.

2. The pre-insulated piping system of claim 1, wherein the inner metal carrier pipe has an opposite end which extends from the anchor block in an opposite direction from anchor sleeve, the opposite end of the inner metal carrier pipe being surrounded by a layer of bonded foam insulation and then by an outer thermoplastic protective jacket, the outer thermoplastic protective jacket, in turn, being surrounded by a cylindrical watershed ring which is joined to the anchor plate and which surrounds and is joined to the outer thermoplastic protective jacket at each of two opposite extents thereof.

3. The pre-insulated piping system of claim 2, wherein the watershed ring is formed of metal and the outer thermoplastic protective jacket is formed of a synthetic polyolefin material, and wherein the watershed ring is joined to the outer thermoplastic protective jacket by a sleeve of heat shrink material.

4. The pre-insulated piping system of claim 3, wherein the foam insulation is selected from the group consisting of polyurethane foams and high temperature polyisocyanurate foams.

5. The pre-insulated piping system of claim 4, wherein the lengths of insulated piping are part of a pipeline conveying steam, hot water or other hot fluids at a temperature above about 212° F.

* * * * *